United States Patent
Dyer et al.

(10) Patent No.: US 10,648,876 B2
(45) Date of Patent: May 12, 2020

(54) OPTICAL CABLE FOR SENSING, METHODS OF MANUFACTURE THEREOF AND ARTICLES COMPRISING THE SAME

(71) Applicant: OFS Fitel, LLC, Norcross, GA (US)

(72) Inventors: Robert S Dyer, East Granby, CT (US); Jie Li, Unionville, CT (US); John E Pacini, Glastonbury, CT (US); Brian Violette, East Granby, CT (US)

(73) Assignee: OFS FITEL, LLC, Norcross, GA (US)

( * ) Notice: Subject to any disclaimer, the term of this patent is extended or adjusted under 35 U.S.C. 154(b) by 0 days.

(21) Appl. No.: 16/040,950

(22) Filed: Jul. 20, 2018

(65) Prior Publication Data

US 2019/0033145 A1    Jan. 31, 2019

Related U.S. Application Data

(60) Provisional application No. 62/536,575, filed on Jul. 25, 2017.

(51) Int. Cl.

| | |
|---|---|
| *G01L 1/24* | (2006.01) |
| *G01K 11/32* | (2006.01) |
| *G01D 5/353* | (2006.01) |
| *G01D 5/26* | (2006.01) |
| *G02B 6/44* | (2006.01) |
| *G02B 6/02* | (2006.01) |

(52) U.S. Cl.
CPC ........... *G01L 1/242* (2013.01); *G01D 5/35374* (2013.01); *G01K 11/32* (2013.01); *G01D 5/268* (2013.01); *G02B 6/02342* (2013.01); *G02B 6/02395* (2013.01); *G02B 6/4429* (2013.01); *G02B 6/4434* (2013.01)

(58) Field of Classification Search
None
See application file for complete search history.

(56) References Cited

U.S. PATENT DOCUMENTS

2014/0056553 A1*  2/2014  Villiger ............. G02B 6/4407
385/12

\* cited by examiner

*Primary Examiner* — Jerry Rahll
(74) *Attorney, Agent, or Firm* — David E. Rodrigues, Esq.

(57) ABSTRACT

Disclosed herein is an optical cable comprising a plurality of cable sensors helically wound around a support; and an outer jacket that is disposed on the plurality of cable sensors and surrounds the plurality of cable sensors; where each cable sensor comprises an optical fiber; where the optical fiber comprises an optical core upon which is disposed a cladding; a primary coating; a deformable material surrounding the optical fiber; and an outer tube surrounding the deformable material; where the optical fiber is of equal length to the outer tube; and where an allowable strain on the optical cable with zero stress on the optical fiber is determined by equations (1) and (2) below:

$$\varepsilon = \frac{\sqrt{\pi^2\left(D+\frac{d}{2}\right)^2 + p^2}}{p} - \frac{\sqrt{\pi^2\left(D-\frac{d}{2}\right)^2 + p^2}}{p} = \frac{\pi^2 dD}{p^2} = \frac{10dD}{p^2} \quad (1)$$

$$\varepsilon \times 100 = \text{Percent elongation or contraction;} \quad (2)$$

where d is the amount of optical fiber clearance for free movement within the loose tube, D is an average pitch diameter of the plurality of cable sensors and p is an average pitch length of a helical turn of the plurality of cable sensors wound around the central strength member.

16 Claims, 4 Drawing Sheets

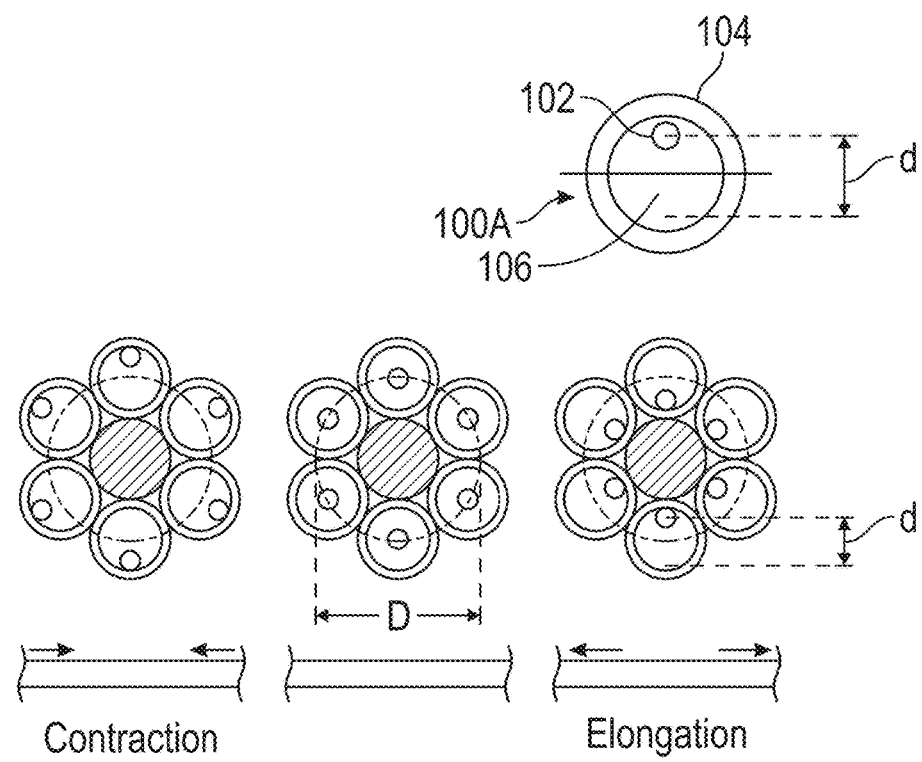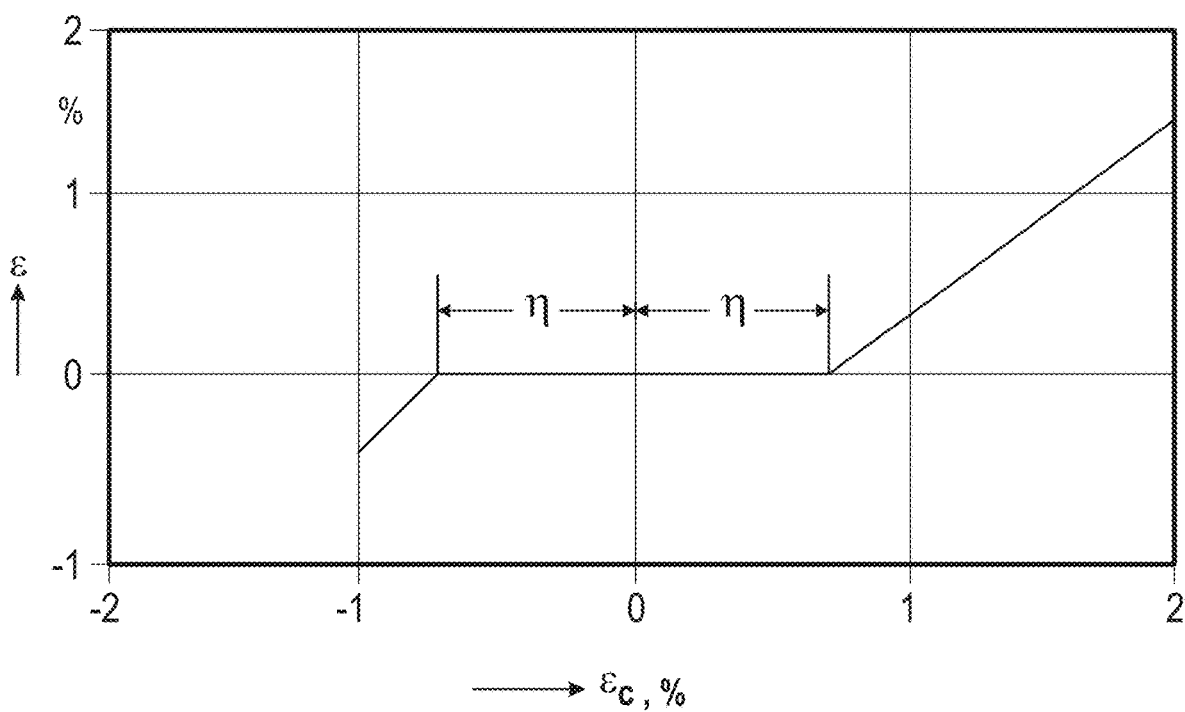
FIG. 4

OPTICAL CABLE FOR SENSING, METHODS OF MANUFACTURE THEREOF AND ARTICLES COMPRISING THE SAME

CROSS REFERENCE TO RELATED APPLICATIONS

This application is a Non-Provisional application which claims the benefit of U.S. Provisional Application No. 62/536,575, filed Jul. 25, 2017, which is incorporated by reference in its entirety herein.

BACKGROUND

This disclosure relates to an optical cable used for sensing, methods of manufacture thereof and to an article comprising the same. More specifically, this disclosure relates to an optical cable used for sensing temperature and strain, methods of manufacture thereof and to an article comprising the same.

In applications such as offshore oil pipelines, in order to aid in the flow of oil through the pipeline, the pipe is heated and the pipeline temperature controlled. When the pipe with the sensing cable installed is loaded onto a boat, transported and offloaded for deployment, during the steps of the installation process, the pipe can be exposed to both tensile and compressive forces resulting in a positive (+) or negative (−) change in length (strain). The optical fiber cable sensor attached to the pipe must be able to withstand these changes in length without transmitting any detrimental stress onto the optical fiber. Excessive stress on the optical cable due to this mechanical deformation for an extended period of time could result in premature mechanical failure of the optical fiber (which is part of the optical cable). If any of the stress on the optical cable is transferred and permanently imparted to the optical fiber, the accuracy of the temperature measurement in application is adversely affected. It is therefore desirable in cable design to reduce the strain that the optical fibers experience during installation to avoid any detrimental effect to the reliability of the optical cable.

In addition, in offshore applications the pipeline may see temperatures fluctuations as low as −30° C. and up to +120° C. These temperature changes will cause the fibers to expand (+) and contract (−). It is desirable to permit the fibers to expand or contract while isolating the sensing optical fibers from mechanical or environmental strain or compression in order to ensure both accuracy in temperature measurements and to assure long-term survival following manufacture and installation. It is therefore also desirable for cable design to accommodate stresses induced by the deformation caused by temperature change.

SUMMARY

Disclosed herein is an optical cable comprising a plurality of cable sensors helically wound around a support; and an outer jacket that is disposed on the plurality of cable sensors and surrounds the plurality of cable sensors; where each cable sensor comprises an optical fiber; where the optical fiber comprises an optical core upon which is disposed a cladding; a primary coating; a deformable material surrounding the optical fiber; and an outer tube surrounding the deformable material; where the optical fiber is of equal length to the outer tube; and where an allowable strain on the optical cable with zero stress on the optical fiber is determined by equations (1) and (2) below:

$$\varepsilon = \frac{\sqrt{\pi^2\left(D+\frac{d}{2}\right)^2 + p^2}}{p} - \frac{\sqrt{\pi^2\left(D-\frac{d}{2}\right)^2 + p^2}}{p} = \frac{\pi^2 dD}{p^2} = \frac{10dD}{p^2} \quad (1)$$

$$\varepsilon \times 100 = \text{Percent elongation or contraction;} \quad (2)$$

where d is the amount of optical fiber clearance for free movement within the loose tube, D is an average pitch diameter of the plurality of cable sensors and p is an average pitch length of a helical turn of the plurality of cable sensors wound around the central strength member.

Disclosed herein too is a method of manufacturing an optical cable comprising helically winding a plurality of cable sensors around a support; and disposing an outer jacket on the plurality of cable sensors such that the outer jacket surrounds the plurality of cable sensors; where each cable sensor comprises an optical fiber; where the optical fiber comprises: an optical core upon which is disposed a cladding; a primary coating; a deformable material surrounding the optical fiber; and an outer tube surrounding the deformable material; where the optical fiber is of equal length to the outer tube; and where an allowable strain on the optical cable with zero stress on the optical fiber is determined by equations (1) and (2) below:

$$\varepsilon = \frac{\sqrt{\pi^2\left(D+\frac{d}{2}\right)^2 + p^2}}{p} - \frac{\sqrt{\pi^2\left(D-\frac{d}{2}\right)^2 + p^2}}{p} = \frac{\pi^2 dD}{p^2} = \frac{10dD}{p^2} \quad (1)$$

$$\varepsilon \times 100 = \text{Percent elongation or contraction;} \quad (2)$$

where d is the amount of optical fiber clearance for free movement within the loose tube, D is an average pitch diameter of the plurality of cable sensors and p is an average pitch length of a helical turn of the plurality of cable sensors wound around the central strength member.

BRIEF DESCRIPTION OF THE FIGURES

FIG. 4 is a graph that depicts strain in the optical fiber for several different positions of the optical fiber within the cable sensor.

DETAILED DESCRIPTION

Disclosed herein is a multi-fiber stranded loose tube cable (hereinafter optical cable) with at least one optical fiber sensor per tube. The optical fiber sensors are hereinafter labelled "cable sensors". In an exemplary embodiment, the optical cable comprises a plurality of loose tube buffered optical fiber sensors that are wound around a central strength member and bound together with a tape wrap and outer jacket. The overall optical cable diameter is less than 5 millimeters. To achieve such a small cable optical diameter with the permitted allowable free fiber movement (to accommodate for the temperature and stress variations detailed above), an extremely short pitch length (p) is used for the cable sensors.

Figure 1:
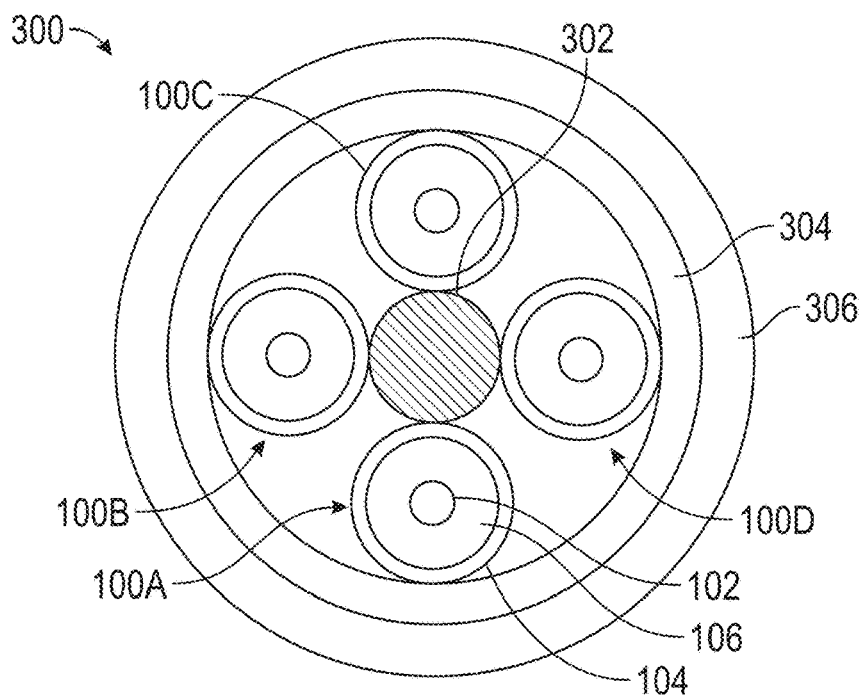
FIG. 1 is a schematic depiction of one exemplary embodiment of the optical cable.

FIG. 1 is a schematic depiction of one exemplary embodiment of the optical cable 300. The optical cable 300 comprises a plurality of loose tube buffered optical fibers (cable sensors—100A, 100B, 100C and 100D) that are wound around a central strength member 302 and bound together with a tape wrap 304 and an outer jacket 306. The optical cable may comprise 2 or more, preferably 3 or more, and more preferably 4 or more cable sensors. In a preferred embodiment, the optical cable 300 comprises 4 cable sensors 100A, 100B, 100C and 100D.

The cable sensors 100A, 100B, 100C and 100D will now be detailed using fiber 100A as an example. The cable sensor 100A comprises an optical fiber 102 disposed in a flexible protective tube 104 that serves to protect the fiber from temperature variations, variations in strain, or from other perturbations. The flexible tube 104 surrounds the optical fiber 102 and contains a deformable material 106 that permits deformation (of the tube) without deformation of the optical fiber 102 when the cable sensor 100A (or 100B, 100C and/or 100D) is subjected to any form of perturbation. The deformable material 106 is disposed between the optical fiber 102 and the flexible tube 104.

Figure 2:
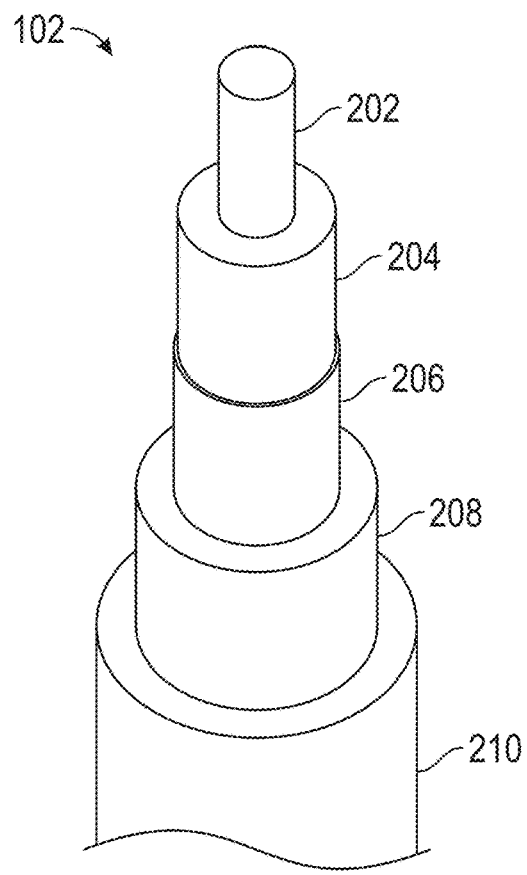
FIG. 2 is a schematic depiction of an exemplary optical fiber that is disposed in the optical cable.

With reference to the FIG. 2, the optical fiber 102 (which serves as the sensor) comprises a core 202, a cladding 204 disposed on the core 202, a carbon layer 206 disposed on the cladding 204, a primary coating 208 disposed on the carbon layer 206 and a secondary coating 210 disposed on the primary coating 208. The optical fiber 102 within the flexible tube 104 may be a single mode or multimode fiber. In an embodiment, the core of the optical fiber 102 is a silica core 202 having an outer diameter of 5 to 100 micrometers, preferably 10 to 50 micrometers, and preferably 15 to 35 micrometers. The core 202 may be doped with germania ($GeO_2$), phosphorus pentoxide ($P_2O_5$), alumina ($Al_2O_3$), titania ($TiO_2$), or a combination thereof, to raise the refractive index of the core.

The core 202 has a layer of cladding 204 concentrically applied over the fiber core. This cladding 204 has a lower refractive index than the core 202 to confine the distributed acoustic signal traveling back along the optical core. The cladding has an outer diameter in the range of 80 to 250 micrometers.

The cladding 204 is made from silica with no doping, or alternatively, made from silica with a dopant that reduces the refractive index relative to the refractive index of the core. Suitable dopants that are used to reduce the refractive index of the cladding relative to the core include fluorine, boron oxide, or a combination thereof.

The cladding 204 may optionally be coated with a layer of amorphous carbon 206 to create a hermetic protective layer over the sensing fiber. The layer of amorphous carbon 206 is a hermetic coating that is impervious to molecular water or hydrogen that may be present in the sensing environment. It has been shown that the ingress of hydrogen and water into the silica glass core can cause crack growth from flaws that may already exist within the silica glass. Such crack growth could result in premature failure of the optical fiber sensor.

Coatings 208 (primary coating) and 210 (secondary coating) are applied to the cladding or to the carbon layer during the production of the optical fiber 102 to maintain the pristine condition of the core 202 (e.g., the silica glass sensing fiber which exists within the manufacturing optical fiber drawing process). The coatings also provide for easier handing of the optical fiber sensor. The coatings are preferably selected to meet the lower and upper service temperatures encountered by the optical fiber as well as to protect the core of the fiber from harsh chemical environments that can be encountered in oil wells or in other mining operations.

It is desirable for the coatings to protect the optical fiber from temperatures of −50° C. to +150° C. These coatings are thermosetting and may be cured with temperature (i.e. thermally cured) or with ultraviolet (UV) light. The coating may be applied in two or more layers. The primary coating 208 (also sometimes referred to a first layer) comprises a very soft material. It may be a silicone or urethane based coating. This soft primary layer provides resistance to micro-bending within the optical fiber when strained. Excessive micro-bending can result in signal loss within the optical fiber. The outside diameter of the primary coating may be 120 to 250 micrometers.

A secondary coating 210 is disposed over the primary coating to provide a harder protective shell to the coated optical fiber. The secondary coating has a higher hardness than the primary coating. The harder secondary coating also provides case of handing of the optical sensing fiber. This harder layer may be a material such as cross-linked acrylate, cured with temperature or ultraviolet light. In some instances an extruded thermoplastic material may be used as the secondary coating for the optical acoustic sensing fiber. Examples of commercially available materials that are used to meet the environmental requirements of the sensing application are polyvinylidene fluoride (KYNAR®), polytetrafluoroethylene (TEFLON®), polyurethanes, or a combination thereof. The outside diameter of the secondary coating may be 170 to 320 micrometers.

The optical fiber 102 has a length that is 0.1 to 2% longer than the length of the flexible tube 104 that surrounds it. In an alternative embodiment, the optical fiber 102 has a length that is 0.5 to 1.5% longer than the length of the flexible tube 104 that surrounds it. In yet an alternative embodiment, the optical fiber 102 has a length that is 0.7 to 1.4% longer than the length of the flexible tube 104 that surrounds it. This additional length permits the optical fiber to flex, bend, or to stretch, without any undesirable perturbation to the optical or acoustic signals being transmitted along the core of the fiber when the flexible tube 104 is flexed, bent, or stretched in application.

With reference now again to the FIG. 1, the optical fiber 102 (which is used for sensing) is surrounded by a deformable material 106. The deformable material 106 permits the fiber to deform without imposing any stress or strain on the fiber that can cause signal deterioration. The deformable material is therefore a material that is easily compressed or that has a low modulus of elasticity. The deformable material 106 preferably does not interact with the primary or secondary coating.

In an embodiment, the deformable material 106 comprises a fluid such as air, inert gases such as nitrogen, argon, carbon dioxide; water, oil, organic liquids, or a combination thereof. A preferred fluid is air.

In another embodiment, the deformable material 106 can comprises an elastomeric material. Elastomeric materials are those that have an elastic modulus of less than $10^6$ pascals when measured at room temperature. Examples of elastomeric materials are polysiloxanes, polyurethanes, styrene-butadiene rubbers, polybutadiene, polyisoprene, styrene-butadiene-acrylonitrile rubbers, polychloroprene, perfluoro elastomers, fluorosilicone elastomers, fluoro elastomers, ethylene vinyl acetate, polyetherimides, or the like, or a combination thereof.

The elastomers may be used in the form of a non-flowable solid (having a porosity of less than 10 volume percent), a foam (having a porosity of greater than 70 volume percent), a deformable flowable gel (that can flow without the application of any applied force other than gravity), or a combination thereof.

The deformable material 106 permits the optical fiber 102 to bend or to deform. The deformable material 106 undergoes deformation as a result of forces transmitted to it by the outer tube 104 and/or by the fiber 102. In undergoing deformation, the deformable material prevents damage from occurring to the optical fiber 102.

The outer tube 104 encloses the deformable material 106 and the optical fiber 102. It is desirable for the material used to manufacture the outer tube to be highly flexible for use in long term dynamic applications, have a low coefficient of thermal expansion and contraction for dimensional stability over the operating temperature range, be capable of withstanding both a low and high service temperature, have a high tensile modulus for strength, display chemical resistance for use in harsh environments, and display abrasion resistance for toughness and imperviousness to UV degradation for exposure to sunlight.

The outer tube 104 tube has an outer diameter of 1.5 to 2.0 millimeters (mm), preferably 1.6 to 1.9 mm and an inside (inner) diameter of 0.8 to 1.2 mm, preferably 0.9 to 1.1 mm. These dimensions, outer and inner diameter, may vary depending on the system installation factors, so long as an appropriate amount of EFL is contained within the tube. This construction also allows for the transmission of acoustic signals through the tube material as well as through the deformable material within the tube to the optical fiber sensor.

The outer tube 104 material preferably comprises a polymeric material having a glass transition temperature of greater than 150° C. In an embodiment, the outer tube comprises a fluoropolymer, a perfluoropolymer, or copolymers thereof. Copolymers of the fluoropolymer are preferred. Suitable commercially available fluoropolymers for use in the outer tube are KYNAR for polyvinylidene fluoride; TEFZEL for ethylene tetrafluoroethylene; TEFLON, FLUON, DYNEON and NEOFLON.

With reference once again now to the FIG. 1, the optical cable 300 comprises a plurality of loose tube buffered optical fibers (cable sensors—100A, 100B, 100C and 100D) that are wound around a central strength member 302 and bound together with a tape wrap 304 and an outer jacket 306. In an embodiment, the cable sensors 100A, 100B, 100C and 100D are helically wound around the central strength member 302. This arrangement facilitates the accommodation of persistent strains on the cable sensors. Persistent strain at levels of 1%, on an optical fiber may result in premature mechanical failure. To avoid direct transfer of external cable strain onto the optical fibers (the cable sensors 100A, 100B, 100C and 100D) within the cable structure, the optical fibers are allowed to move freely both radially and longitudinally. In a stranded loose tube cable, the amount of allowable cable elongation and/or contraction (ε) before fiber movement is restricted, is determined by the amount of clearance for the optical fiber to move within the loose tube (d), the pitch diameter (D) and the pitch length (p) as shown in the equations (1) and (2) below.

$$\varepsilon = \frac{\sqrt{\pi^2\left(D+\frac{d}{2}\right)^2 + p^2}}{p} - \frac{\sqrt{\pi^2\left(D-\frac{d}{2}\right)^2 + p^2}}{p} = \frac{\pi^2 dD}{p^2} = \frac{10 dD}{p^2} \quad (1)$$

$$\varepsilon \times 100 = \text{Percent elongation or contraction,} \quad (2)$$

where d is the amount of clearance for the optical fiber to move within the loose outer tube, D is the average pitch diameter of the cable sensors 100A, 100B, 100C and 100D and p is the average pitch length of the helix of the cable sensors 100A, 100B, 100C or 100D wound around the central strength member 302 (the support 302) (See FIG. 1.). The amount "d" is calculated as the linear difference between the outer diameter of the optical fiber 102 and the inner diameter of the loose outer tube 104. The outer diameter of the optical fiber 102 is subtracted from the inner diameter of the loose outer tube 104 to obtain the value of "d".

Figure 3:
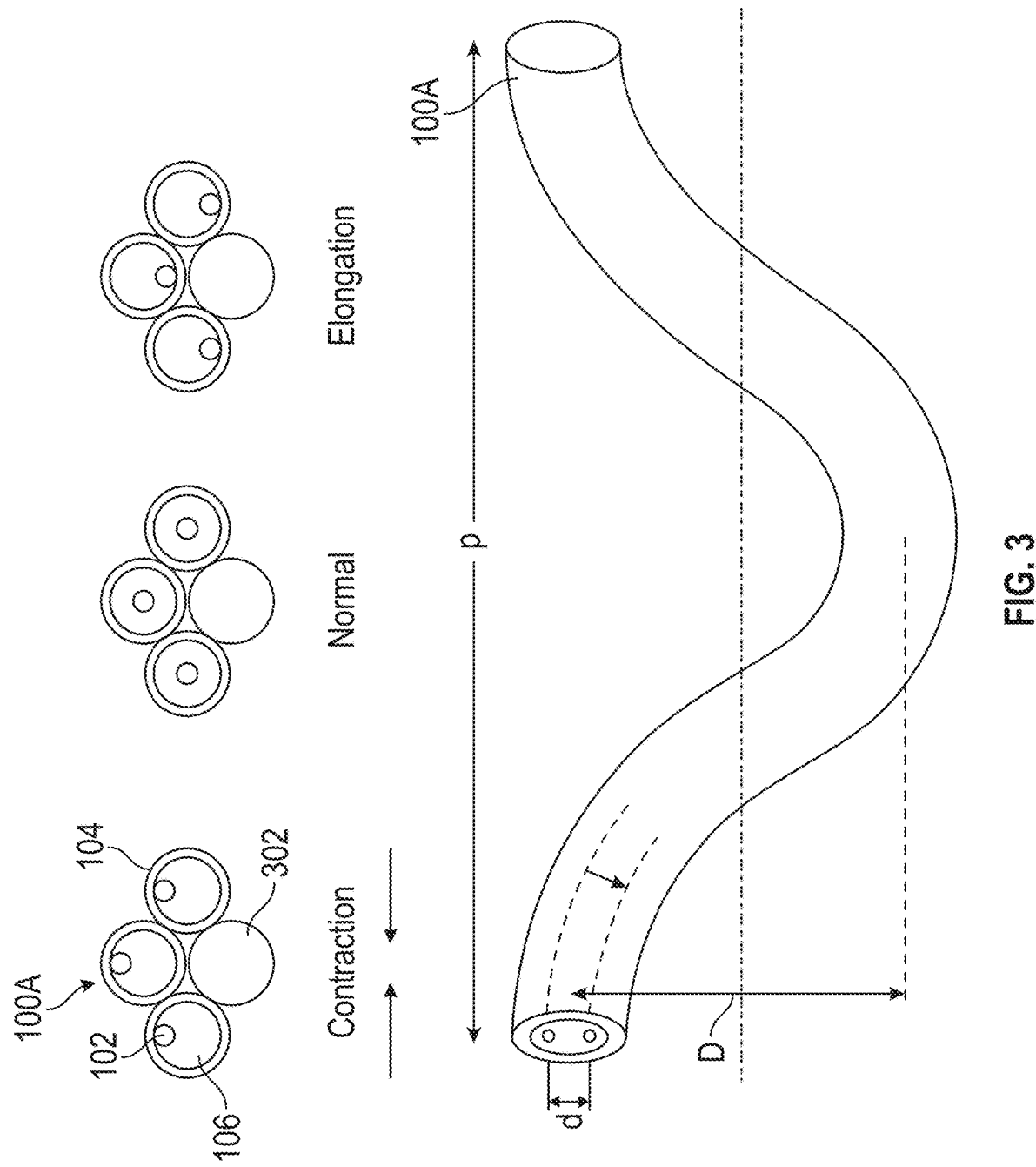
FIG. 3 depicts one pitch of the helix of the cable sensor and how the design permits the optical fibers to move freely in the radial direction when the optical cable is subjected to contraction, to elongation or is in the normal position.

FIG. 3 depicts one pitch of the helix of the cable sensor 100A and how the design permits the optical fibers 102 to move freely in the radial direction when the optical cable 300 is subjected to contraction, to elongation or is in the normal position. As detailed above, the optical fiber 102 has a length that is of equal length to the flexible tube 104 that surrounds it. The fiber is of the same length as the tube i.e. in a neutral position. The uniqueness of this design is the cable can contract or elongate up to +/−2% while allowing stress free movement of the optical sensing fiber.

In addition, the inside diameter (ID) of the flexible tube 104 is several times (200 to 450%) larger than the diameter of the optical fiber 102. As a result, the optical fiber 102 is free to move within the cable sensor 100A when the optical cable 300 is subjected to strain such as when it is bent.

When the optical cable 300 is subjected to contraction (i.e., the pitch p is reduced to below an optimal length), the optical fiber 102 which is free to move within the outer tube 104 (See FIG. 3) moves to the top of the outer tube 104. When the optical cable 300 is subjected to neither contraction nor expansion (i.e., the pitch p is at an optimal length), the optical fiber 102 which is free to move within the loose outer tube 104 (See FIG. 1) stays at the center (i.e., a neutral position) of the outer tube 104. When the optical cable 300 is subjected to expansion (i.e., the pitch p is increased above an optimal length), the optical fiber 102 which is free to move within the loose outer tube 104 (See FIG. 3) moves to the bottom of the outer tube 104.

The average pitch length p and pitch diameter D are selected to maintain the extended sections of the optical fiber 102 in a state close to zero stress and strain as much as possible. In an embodiment, the average pitch p of the helically wound cable sensors 100A, 100B, 100C and 100D is 10 to 100 millimeters, preferably 20 to 50 millimeters. In another embodiment, the average pitch diameter D of the cable sensor 100A, 100B, 100C and 100D is 1 to 10 millimeters, preferably 2 to 4 millimeters. It is desirable to choose values for the average pitch p and the pitch diameter D that permit the optical fiber 102 to be located in the center of the cable sensor 100A (during operation) so that is does not suffer undue stress.

The FIG. 4 contains a graph and several positions of the optical fiber 102 within the cable sensor 100A and depicts how maintaining the optical fiber 102 within the center of the cable sensor 100A produces minimal stress within the optical fiber 102. The graph is a plot of the strain (s) in the optical fiber versus the strain ($\varepsilon_c$) in the cable. As may be seen, by selecting optimal values for the pitch length p, pitch diameter D, and allowable optical fiber movement within the loose tube d, a stress free region (2η) can be created and maximized in the cable sensors 100A, 100B, 100C and 100D, which facilitates accurate temperature sensing using a Brillouin scatting based method.

With reference now again to the FIG. 1, the central strength member 302 (hereinafter support 302) provides strength and support to the optical cable 300. The support 302 is preferably a metal or polymeric wire that is ductile and that can withstand temperatures to which the cable sensor will be subjected to. In an embodiment, the central strength member 302 comprises copper, aluminum, steel (e.g., carbon steel, stainless steel, or the like), titanium, bronze, brass, or a combination thereof. Suitable polymers are those that have melting points greater than 200° C. Examples of such polymers are polyetherimides, polyimides, polyethersulfones, polysulfones, polytetrafluoroethylene, epoxies, polyesters, or the like, or a combination thereof. In an exemplary embodiment, the support 302 comprises a continuous fiber reinforced polymeric composite. An exemplary fiber reinforced polymeric composite is a glass fiber reinforced epoxy composite.

The outer diameter of the support 302 is selected to permit the cable sensors 100A, 100B, 100C and 100D to be helically wound and to have a pitch length p and diameter D that minimizes strain on the optical fiber 102 and facilitates retention of the optical fiber 102 in the center of the respective cable sensors 100A, 100B, 100C and 100D. The central strength member 302 may be cylindrical or hollow (i.e., is tubular) and has an outer diameter of 0.5 to 2.5 millimeters.

The tape wrap 304 is optional and comprises a tape that is operative to retain the cable sensors 100A, 100B, 100C and 100D in position on the support 302. The tape wrap 304 comprises a polymer that can withstand the temperatures that the optical cable 300 will be subjected to without degrading or reacting with other components in the optical cable 300. The tape is flexible (i.e., it can be mechanically deformed easily under average human force). The polymer used in the tape wrap 304 is preferably a fluoropolymer, polyimide or polyetherimide that has a melting point above 150° C., preferably greater than 200° C. In an embodiment, the tape wrap 304 comprises a fluoropolymer, a perfluoropolymer, or copolymers thereof. Copolymers of the fluoropolymer are preferred. Suitable commercially available fluoropolymers for use in the tape wrap are polyvinylidene fluoride (e.g., KYNAR); ethylene tetrafluoroethylene (e.g., TEFZEL); polytetrafluoroethylene (e.g., TEFLON, FLUON, DYNEON and NEOFLON). Suitable polyimide films in the tape wrap 304 include KAPTON and ULTEM. Polyetherimides such as SILTEM may also be used in the tape wrap 304 for wrapping the cable sensors.

The outer jacket 306 preferably comprises a polymer that can withstand the temperatures that the optical cable 300 will be subjected to without degrading or reacting with other components in the optical cable 300. The outer jacket 306 is flexible (i.e., it can be mechanically deformed easily under average human force) and preferably has an elastic modulus of less than $10^6$ pascals when measured at room temperature. The polymer used in the outer jacket 306 is preferably a fluoropolymer, polyimide or a polyetherimide that has a melting point above 150° C., preferably greater than 200° C. The fluoropolymers used in the outer jacket 306 can be one of those listed above for the tape wrap 304.

In one embodiment, in one method of manufacturing the optical cable 300, the cable sensors 100A, 100B, 100C and 100D, and so on, are helically wound in position on the support 302. The winding is maintained at a pitch p length that minimizes strain on the optical fiber 102. A tape wrap 304 is then wrapped around the cable sensors 100A, 100B, 100C and 100D, and so on. Following the wrapping of the tape wrap 304, the outer jacket 306 may be extruded onto the tape wrap 304. Crosshead extrusion may be used in the extrusion process to dispose the outer jacket 306 onto the tape wrap 304.

The design detailed above has a number of advantages. The materials selected allow for an operating temperature range of −45° C. to +125° C., which is greater than the operating temperature range of −40° C. to +85° C. for commercially available telecommunications cable. The loose tubed optical fibers are helically wound to create a mechanism that reduces the stress level that the optical fiber experiences when the optical cable 300 is stretched or bent. Due to the harsh nature of the oil and gas industry, the sensor will typically be in dynamic motion and experience levels of strain much greater than that expected for a telecommunications cable. For this design, the strain level is +/−2%. The optical cable 300 disclosed herein may have a length that exceeds 10 kilometers, preferably exceeds 20 kilometers, and more preferably exceeds 50 kilometers.

A unique combination of these optical cable design principles, material selection and cable manufacturing technique permits the successful production of this small diameter distributed temperature sensing (DTS) optical cable, which operates at a wide temperature range, under high levels of mechanical stress, while providing accurate temperature measurement in application. This has been achieved without concern for the surrounding dynamic environmental and mechanical stresses which has, in the past, prohibited the use of optical fiber temperature sensors in this application.

The optical cable disclosed herein is exemplified by the following non-limiting example.

Example

This example details an optical cable designed to reduce the mechanical strain that the optical sensing fibers experience during installation process as a sensor for distributed temperature sensing (DTS) using Brillouin Optical Time Domain Analyzer/Reflectometry (BOTDA/R).

The optical cable contained 4 optical sensing fibers (cable sensors). The optical cable length is 1 kilometer (km). The pitch diameter D of the cable was 2.2 millimeter (mm). The OD of the loose tubes was 1.5 mm. The ID of the loose tubes was 1.0 mm. This ID of 1.0 mm with an optical sensing fiber outer diameter of 0.250 mm allowed for a value of 0.75 mm for "d", the amount of allowable movement of the optical sensing fiber within the loose tube. These loose tubes (outside tube), containing the optical sensing fiber, one fiber per tube, was stranded (wrapped) around the central strength member with a pitch length p of 28.5 mm. This allowed for 0% optical fiber strain with up to 2% overall cable elongation (+) or contraction (−). The amount of tensile load required to elongate the cable 2% was 356 Newtons (80 pounds force (lbf)).

Figure 5:
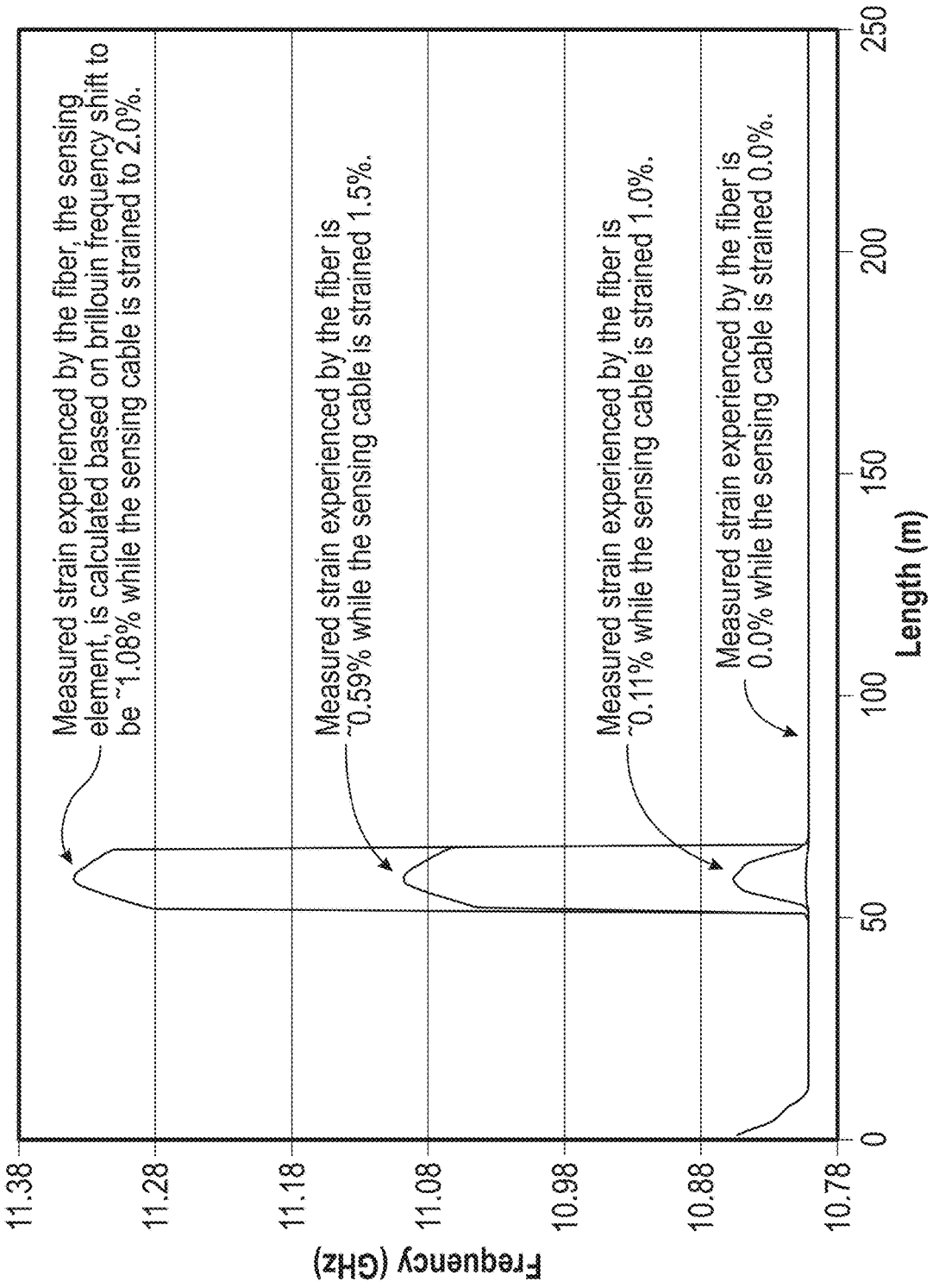
FIG. 5 depicts a graph for a strain test conducted on the disclosed optical cable where the x-axis is the sensing cable length and y-axis is the Brillouin frequency.

A 15 meter section of the sensing cable starting at 50 meters in the chart is the section under test. FIG. 5 depicts a graph for the test, where the x-axis is the sensing cable length and y-axis is the Brillouin frequency. The Brillouin frequency is observed to increase with the elongation strain applied to the section of the sensing cable under test using a mechanical device. The strain level is calculated based on the changes in the measured Brillouin frequency. From the chart, it is seen that the fiber experiences strain with the external applied elongation strain to the sensing cable. However, its magnitude is significantly reduced as the outcome of the cable design to ensure glass optical fiber's mechanical reliability in a high strain environment. From the FIG. 5 it may be seen that the measured strain for the optical fiber is 0% when the optical cable is strained 0%. The measured strain on the optical fiber is 0.10% to 1.1% when the optical cable is strained 1 to 2%.

It is also useful to note the strain level for the section of the cable under test returns to zero as the applied strain is relieved. This ensures more reliable temperature measurement while the sensing cable is in both strain and strain free conditions.

The results shown in the FIG. 5 proves that the design concept in reducing detrimental stress levels to avoid mechanical failure as well as to improve temperature measurement using BOTDA/R.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the invention not be limited to the particular embodiment disclosed as the best mode contemplated for carrying out this disclosure.

What is claimed is:

1. An optical cable comprising:
a plurality of cable sensors helically wound around a support; and
an outer jacket that is disposed on the plurality of cable sensors and surrounds the plurality of cable sensors; where each cable sensor comprises an optical fiber; where the optical fiber comprises:
an optical core upon which is disposed a cladding;
a primary coating;
a deformable material surrounding the optical fiber; and
an outer tube surrounding the deformable material; where the optical fiber is longer than the outer tube by an amount of 0.5 to 1.5%; and
where an allowable strain on the optical cable with zero stress on the optical fiber is determined by equations (1) and (2) below:

$$\varepsilon = \frac{\sqrt{\pi^2\left(D+\frac{d}{2}\right)^2 + p^2}}{p} - \frac{\sqrt{\pi^2\left(D-\frac{d}{2}\right)^2 + p^2}}{p} = \frac{\pi^2 dD}{p^2} = \frac{10dD}{p^2} \quad (1)$$

$$\varepsilon \times 100 = \text{Percent elongation or contraction;} \quad (2)$$

where d is the amount of optical fiber clearance for free movement within the outer tube, D is an average pitch diameter of the plurality of cable sensors and p is an average pitch length of a helical turn of the plurality of cable sensors wound around the support.

2. The optical cable of claim 1, further comprising a tape wrap that is disposed on the plurality of cable sensors and surrounds the plurality of cable sensors.

3. The optical cable of claim 1, where the average pitch length and the average pitch diameter are selected to retain the optical fiber in a state of zero strain.

4. The optical cable of claim 1, where the average pitch length and the average pitch diameter are selected to retain the optical fiber in a state of +/−2% strain.

5. The optical cable of claim 1, where the support is located at a center of the helically wound plurality of cable sensors.

6. The optical cable of claim 5, where the support comprises a ductile metal or a polymer.

7. The optical cable of claim 2, where the tape wrap comprises a polymer that can withstand temperatures of greater than 150° C.

8. The optical cable of claim 2, where the tape wrap comprises a fluoropolymer, a perfluoropolymer, or copolymers thereof.

9. The optical cable of claim 2, where the outer jacket comprises a fluoropolymer, a perfluoropolymer, or copolymers thereof.

10. The optical cable of claim 1, where the plurality of cable sensors comprises 2 or more cable sensors.

11. The optical cable of claim 1, where the plurality of cable sensors comprises 4 cable sensors.

12. The optical cable of claim 1, where the deformable material comprises air.

13. The optical cable of claim 1, where the outer tube has an outer diameter of 1.5 to 2 millimeters and an inner diameter of 0.8 to 1.2 millimeters.

14. A method of manufacturing an optical cable comprising:
helically winding a plurality of cable sensors around a support; and
disposing an outer jacket on the plurality of cable sensors such that the outer jacket surrounds the plurality of cable sensors; where each cable sensor comprises an optical fiber;
where the optical fiber comprises:
an optical core upon which is disposed a cladding;
a primary coating;
a deformable material surrounding the optical fiber; and
an outer tube surrounding the deformable material; where the optical fiber is longer than the outer tube by an amount of 0.5 to 1.5%; and
where an allowable strain on the optical cable with zero stress on the optical fiber is determined by equations (1) and (2) below:

$$\varepsilon = \frac{\sqrt{\pi^2\left(D+\frac{d}{2}\right)^2 + p^2}}{p} - \frac{\sqrt{\pi^2\left(D-\frac{d}{2}\right)^2 + p^2}}{p} = \frac{\pi^2 dD}{p^2} = \frac{10dD}{p^2} \quad (1)$$

$$\varepsilon \times 100 = \text{Percent elongation or contraction;} \quad (2)$$

where d is the amount of optical fiber clearance for free movement within the outer tube, D is an average pitch diameter of the plurality of cable sensors and p is an average pitch length of a helical turn of the plurality of cable sensors wound around the support.

15. The method of claim 14, further comprising disposing a tape wrap on the plurality of cable sensors such that the tape wrap lies between the outer jacket and the cable sensors.

16. The method of claim 14, wherein the disposing of an outer jacket on the plurality of cable sensors is accomplished via extrusion.

* * * * *